United States Patent
Bianco

(10) Patent No.: US 9,356,511 B2
(45) Date of Patent: May 31, 2016

(54) CONTROL CIRCUIT WITH HYSTERESIS FOR A SWITCHING VOLTAGE REGULATOR AND RELATED CONTROL METHOD

(71) Applicant: DORA S.p.A., Aosta (IT)

(72) Inventor: Alberto Bianco, Aosta (IT)

(73) Assignee: STMICROELECTRONICS S.R.L., Agrate Brianza (IT)

( * ) Notice: Subject to any disclaimer, the term of this patent is extended or adjusted under 35 U.S.C. 154(b) by 477 days.

(21) Appl. No.: 13/871,809

(22) Filed: Apr. 26, 2013

(65) Prior Publication Data
US 2013/0285634 A1    Oct. 31, 2013

(30) Foreign Application Priority Data
Apr. 27, 2012  (IT) .............................. MI2012A0697

(51) Int. Cl.
*H02M 3/157* (2006.01)
*H02M 3/156* (2006.01)
*H02M 1/00* (2006.01)

(52) U.S. Cl.
CPC ............ *H02M 3/157* (2013.01); *H02M 3/1563* (2013.01); *H02M 2001/0025* (2013.01)

(58) Field of Classification Search
None
See application file for complete search history.

(56) References Cited

U.S. PATENT DOCUMENTS

| | | | | |
|---|---|---|---|---|
| 3,647,978 A | * | 3/1972 | Hill | G10L 15/02 704/251 |
| 3,803,487 A | * | 4/1974 | Iten | G01R 23/10 324/76.12 |
| 5,519,361 A | * | 5/1996 | Kim | H03K 7/08 332/109 |
| 5,841,641 A | * | 11/1998 | Faulk | H02M 3/335 363/21.14 |
| 6,147,526 A | | 11/2000 | Skelton et al. | |
| 6,396,251 B2 | | 5/2002 | Corva et al. | |
| 7,145,317 B1 | | 12/2006 | Shah | |
| 2005/0001597 A1 | * | 1/2005 | Walters | H02J 1/102 323/222 |
| 2008/0129264 A1 | | 6/2008 | Moussaoui et al. | |

\* cited by examiner

*Primary Examiner* — Timothy J Dole
*Assistant Examiner* — Monica Mata
(74) *Attorney, Agent, or Firm* — Seed IP Law Group PLLC

(57) ABSTRACT

A control circuit for a switching voltage regulator is configured to receive an error signal representative of a regulator output voltage in relation to a nominal output voltage, and includes a set/reset flip-flop, a hysteresis comparator and a logic circuit. The flip-flop is configured to produce a switching control signal according to logic values at its set and reset terminals. The comparator is configured to produce a set signal at the set terminal when an error signal drops below a first value, and a reset signal when the error signal rises above a second value. The logic circuit is configured to prevent transmission of the reset signal to the reset terminal during a selected minimum time period and to thereafter enable transmission of the reset signal, and further, to produce an alternate reset signal at the reset terminal at the end of the selected maximum time period.

14 Claims, 8 Drawing Sheets

CONTROL CIRCUIT WITH HYSTERESIS FOR A SWITCHING VOLTAGE REGULATOR AND RELATED CONTROL METHOD

BACKGROUND

1. Technical Field

This disclosure relates to switching voltage regulators and more particularly to a control circuit with hysteresis adapted to drive a switching power stage of a switching voltage regulator, a relative switching voltage regulator and a method of controlling a switching voltage regulator.

2. Description of the Related Art

Voltage regulators generate a constant DC output voltage and contain circuits that keep the output voltage on a supplied load at a regulated value. This task is typically accomplished using a switching power stage, the switches of which are turned on/off depending on the logic state of a driving signal produced by a regulator control circuit.

A classic architecture of a feedback switching regulator controlled in constant-on-time (COT) mode is shown by way of example in FIG. 1. It comprises an error amplifier EA that generates an error signal $V_{ERR}$ corresponding to the difference between a feedback signal FB, representing the regulated output voltage Vout, and a reference voltage Vref, a comparator COMP of the error signal $V_{ERR}$ with a threshold Vth, adapted to generate an active flag S when the error signal crosses the threshold. At each active transition edge of the flag S, the monostable multivibrator MON generates a pulse command active for a pre-established time interval Ton that fixes the on-time of the power switches such to power the supplied load.

A more detailed architecture corresponding to that of FIG. 1 is shown in FIG. 2. The error signal $V_{ERR}$ is tied to the output voltage $V_{OUT}$ by the following relation:

$$V_{ERR} = V_{OUT} \frac{R_{o2}}{R_{o1} + R_{o2}} \cdot g_m \cdot (R_C + sC_{INT})$$

and the comparison threshold Vth is given by the following equation:

$$V_{th} = kR_L I_L$$

This known architecture generates overshoots when the load decreases just after a constant on-time pulse is started. As schematically illustrated in the exemplary graph of FIG. 3, an overshoot of the output voltage VOUT occurs because the current requested by the load drops abruptly from about 13 A to about 8 A immediately after a new cycle is started.

In order to reduce this undesired effect, the architecture of FIG. 4 has been proposed in literature. Differently from the architecture of FIG. 1, it comprises a hysteresis comparator COMP with a hysteresis voltage Vhyst and a set-reset latch S/R for determining the on-time of the power stage switches. This solution reduces voltage overshoots because the hysteresis comparator shortens the on-time of the switches of the power stage in case of a reduction of the load.

A power supply controller similar to that of FIG. 4 is disclosed in the published patent application US 2008/0129264 and is shown in FIG. 5. The power-supply controller includes a voltage divider 32, an error amplifier 34, an analog-to-digital converter (ADC) 36, a signal combiner (here an adder) 38 for generating a control signal CONTROL, a low-pass filter 40, a signal generator 42, which generates the switching signal PWM and which includes a hysteresis comparator 44 and a reset-set (R/S) flip-flop 46, and a frequency adjuster 48 for generating a frequency-adjust signal. The error amplifier 34 and the analog-to-digital converter 36 generate an error voltage (Vout−Vref)/X corresponding to the difference between a reference voltage Vref and a feedback voltage representing the regulated output voltage Vout. A frequency adjuster 48 compares the switching frequency of the driving signal PWM, provided to the power stage of the regulator, with a reference frequency Freference and generates a corresponding frequency adjustment signal. An adder 38 combines these two signals and the combination of these two signals is transmitted, via a low-pass filter 40, to a hysteretic comparator 44, that sets or resets a S/R flip-flop 46 that generates the driving signal PWM. In practice, the known control circuit of FIG. 5 adjusts the hysteresis window with which the error voltage (Vout−Vref)/X is compared, in order to take into account transient frequencies of the load.

BRIEF SUMMARY

It has been noticed that when the instantaneous frequency of variation of load transients changes abruptly, the known hysteretic switching regulators tend to function in an uncontrolled manner. This effect is illustrated by the graphs of FIG. 6, that compares the results of simulations carried out using the switching regulators of FIG. 4 and of FIG. 5 when the instantaneous frequency of the current absorbed by the supplied load varies fast in a relatively great interval. With the hysteretic voltage regulator of FIG. 5 the output voltage Vout undergoes to unacceptable overshoots and sudden drops.

The performances of this prior switching regulator may be limited by the fact that the frequency adjuster is intrinsically relatively slow in order to have a hysteretic control of the load.

Studies carried out by the applicant led to identify in the relatively slow capability of adjustment of the bounds of the hysteresis window a cause of the above described undesirable behavior of the known switching regulator of FIG. 4. Unfortunately, there may be working conditions in which the instantaneous frequency of the supplied load fluctuates so fast and in such a great range that the frequency adjuster may be incapable of tracking these fluctuations. Therefore, in presence of short-transient large decreases of the load, the voltage in input to the hysteresis comparator increases and decreases very fast, and this transient causes the S/R flip-flop to turn off the power stage even if the load was to be powered.

In order to prevent this inconvenient, the applicant found expedient to provide the control circuit of the switching regulator with a logic circuit adapted to mask the reset signal of the S/R flip-flop for a minimum time interval after an active edge of a set signal, and to reset the S/R flip-flop after a maximum time interval elapsed from the active edge of the set signal, until the next active edge of the set signal is generated.

According to an embodiment, a control circuit for a switching voltage regulator is configured to receive an error signal representative of a regulator output voltage in relation to a nominal output voltage, and includes a set/reset flip-flop, a hysteresis comparator and a logic circuit. The flip-flop is configured to produce a switching control signal according to logic values at its set and reset terminals. The comparator is configured to produce a set signal at the set terminal when an error signal drops below a first value, and a reset signal when the error signal rises above a second value. The logic circuit is configured to prevent transmission of the reset signal to the reset terminal during a selected minimum time interval and to thereafter enable transmission of the reset signal, and further, to produce an alternate reset signal at the reset terminal at the end of the selected maximum time interval.

According to an embodiment, the logic circuit includes a first monostable multivibrator configured to generate a first null flag for the minimum time interval starting from active edges of the set signal; a second monostable multivibrator configured to generate a second null flag for the maximum time interval starting from active edges of the set signal; and logic gates configured to reset the S/R flip-flop when the reset signal is active and the first flag is not null, or when the second flag is not null.

A switching voltage regulator and a related method of controlling a switching voltage generator are also disclosed.

The claims as filed are integral part of this specification and are herein incorporated by reference.

DETAILED DESCRIPTION

Figure 7:
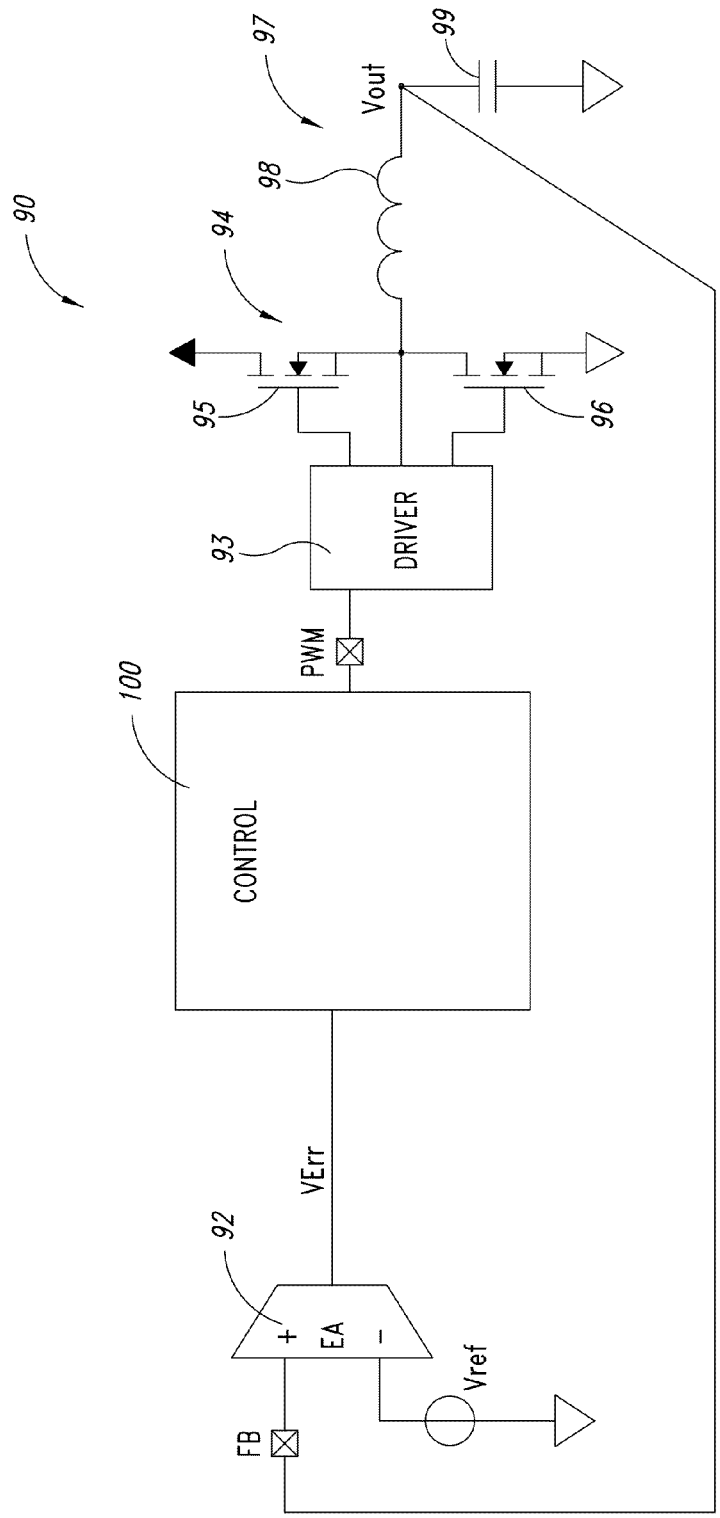
FIG. 7 is a block diagram illustrating a voltage regulator according to one embodiment of the present disclosure.

FIG. 7 is a block diagram illustrating a voltage regulator 90 according to one embodiment of the present disclosure. The voltage regulator 90 includes an error amplifier (EA) 92; a control circuit 100 having an input coupled to an output of the EA 92; a pulse-width modulated (PWM) driver circuit 93 having an input coupled to an output of the control circuit 100; a switching circuit 96 that includes a half-bridge of first and second switching transistors 94, 95, and an LC load circuit 97 that includes an inductance 98 and a capacitance 99.

Figure 8:
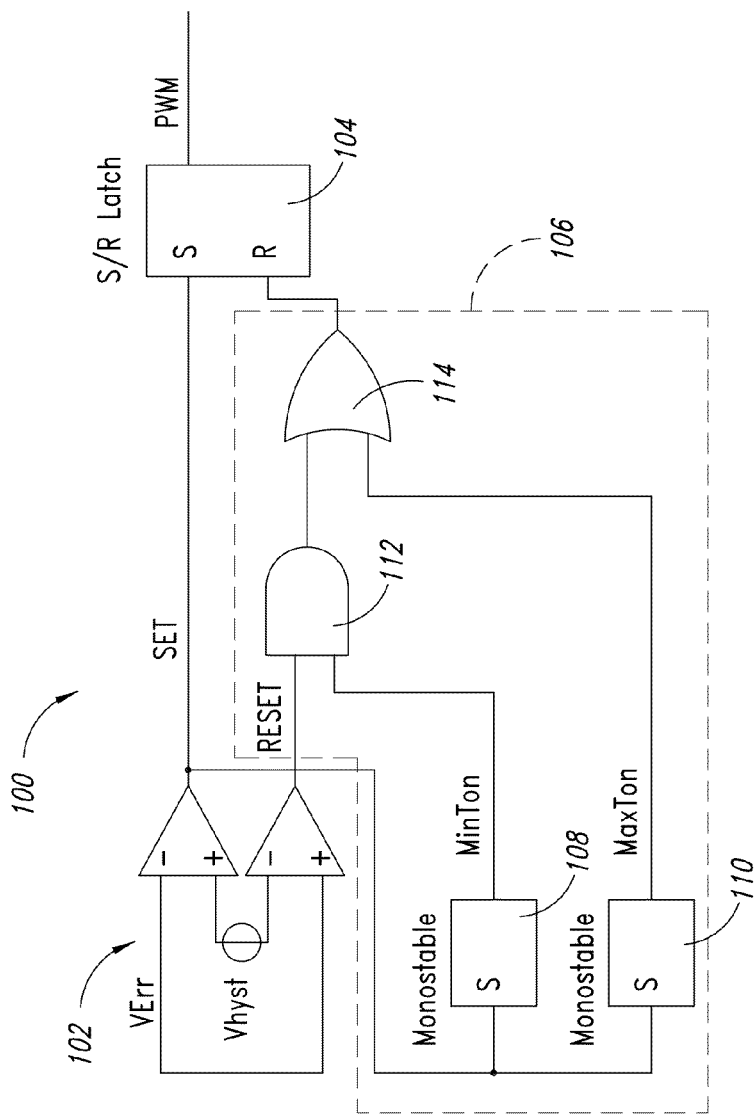
FIG. 8 is a block diagram schematically illustrating a control circuit for a voltage regulator with hysteresis and limitation of the on-time.

An exemplary embodiment of the control circuit 100 with hysteresis of a switching voltage regulator is depicted in FIG. 8. The control circuit 100 is similar in many respects to the circuit described with respect to FIG. 4, and includes a hysteresis comparator 102 and a S/R flip-flop 104. The error signal $V_{ERR}$ is preferably the product of a comparison of a value representative of the output voltage and a reference voltage, and can be obtained, for example, as shown and described with reference to the circuits of any of FIG. 1, 2, 4, or 5.

Figure 1:
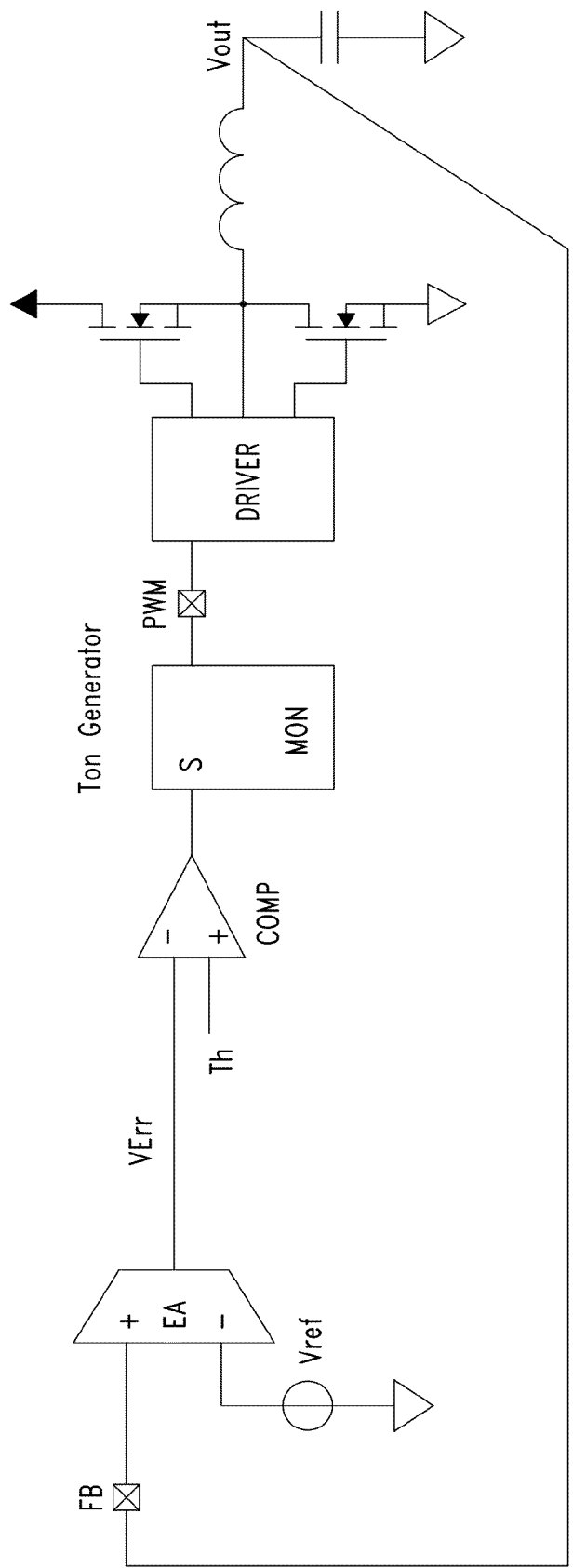
FIG. 1 depicts a known constant-on-time voltage regulator.
Figure 2:
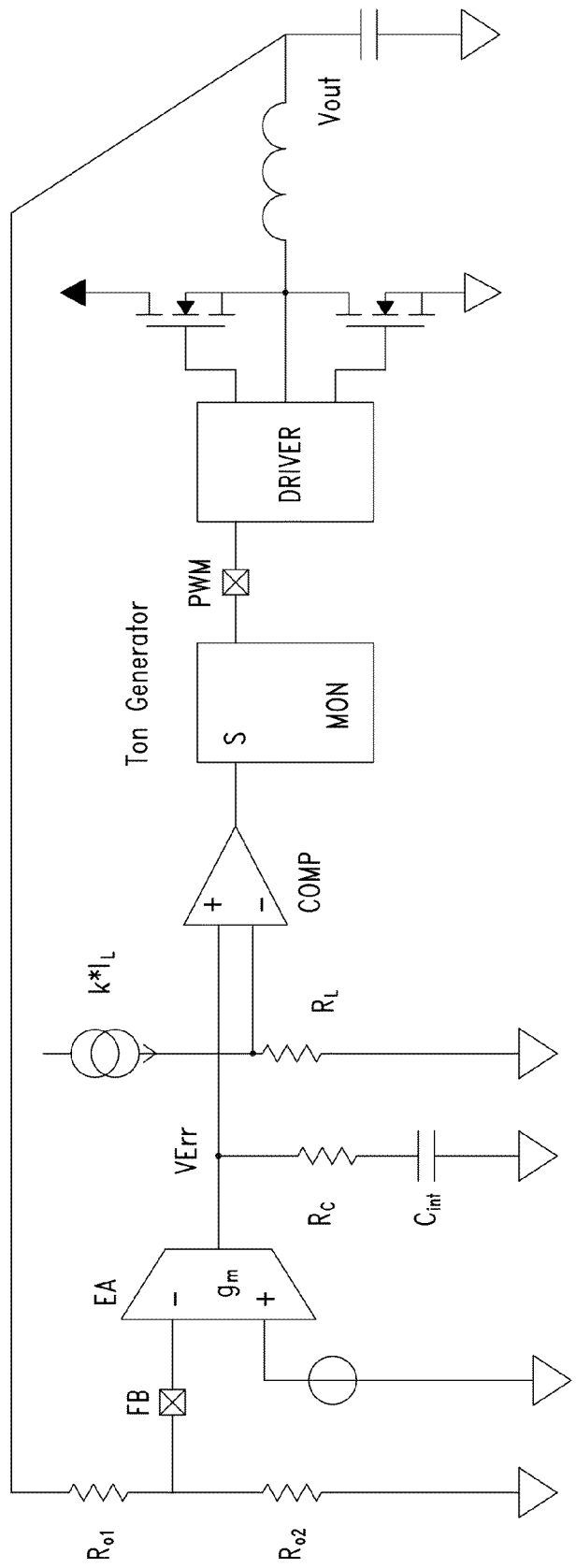
FIG. 2 is a known current mode constant-on-time voltage regulator.
Figure 3:
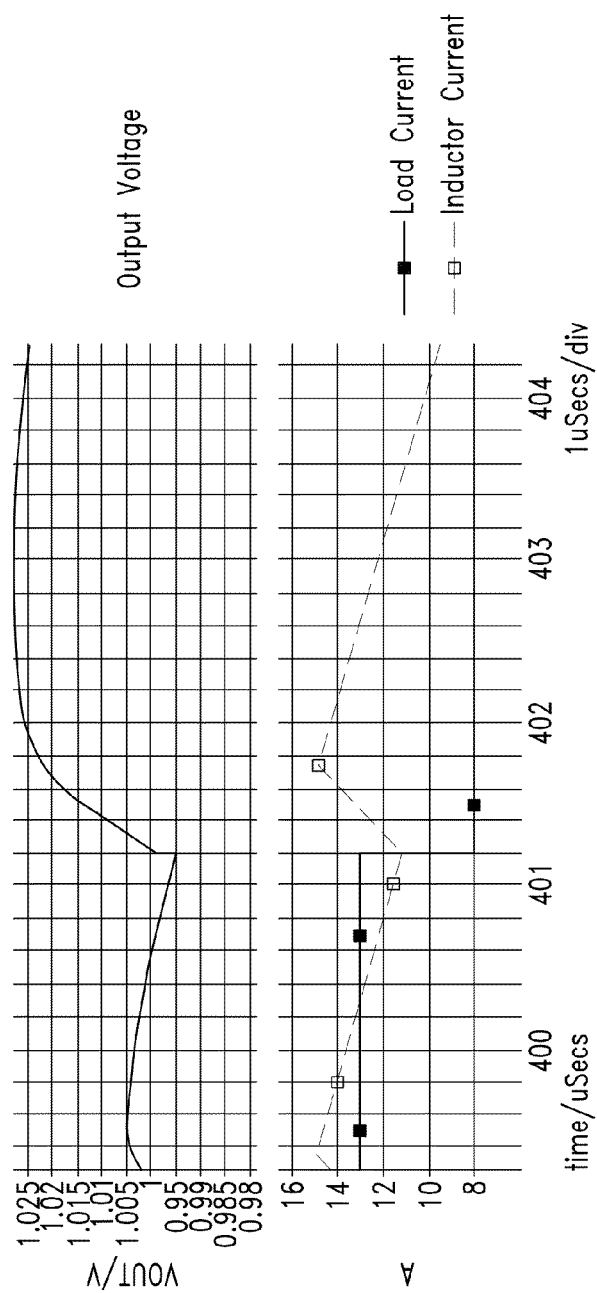
FIG. 3 shows exemplary graphs of simulation of the functioning of the voltage regulator of FIG. 1 in case of abrupt reduction of the supplied load.
Figure 4:
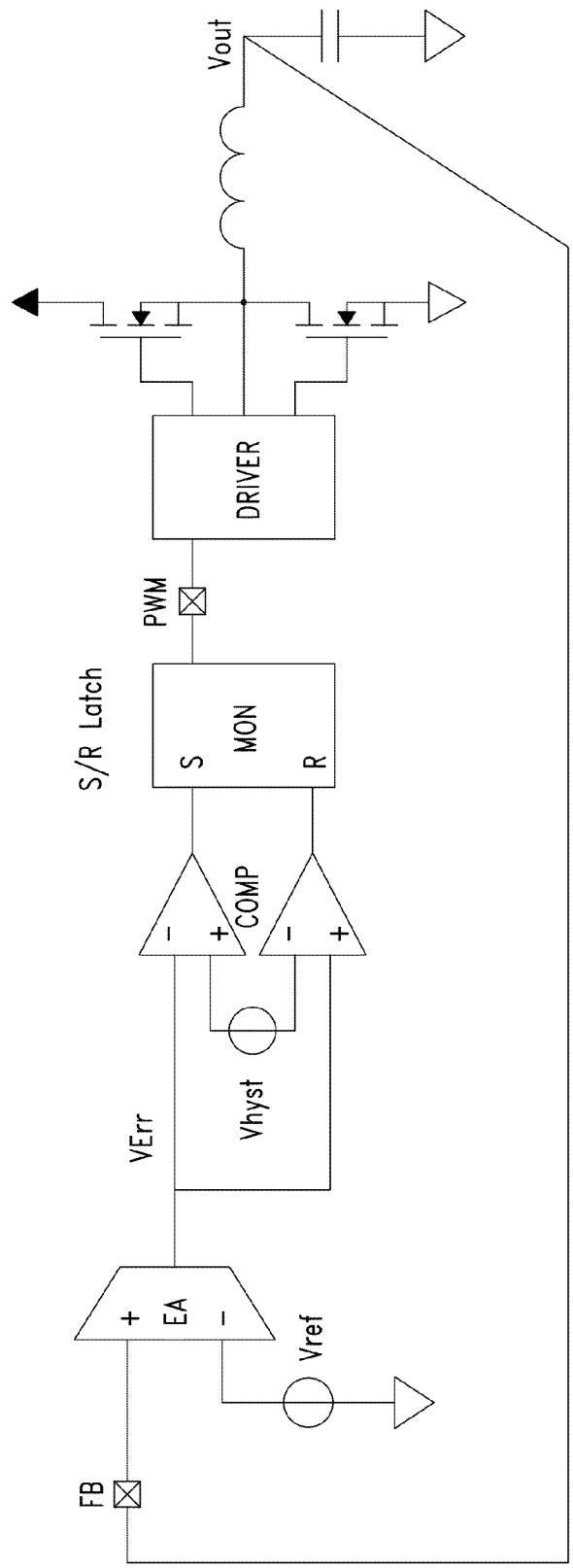
FIG. 4 depicts a known voltage regulator with hysteresis.
Figure 5:
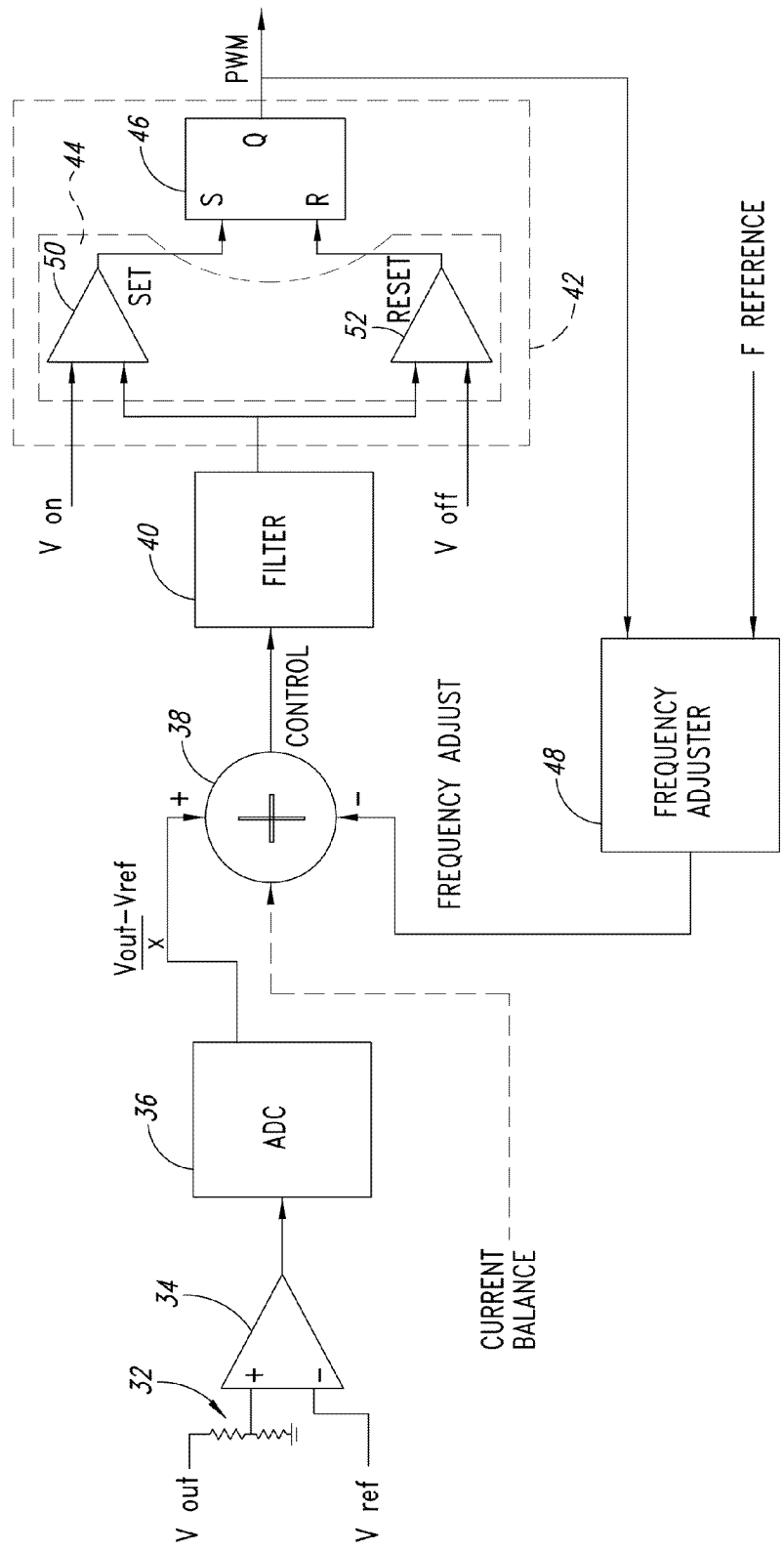
FIG. 5 shows a control circuit of a hysteretic switching voltage regulator disclosed in the document US 2008/0129264.
Figure 6:
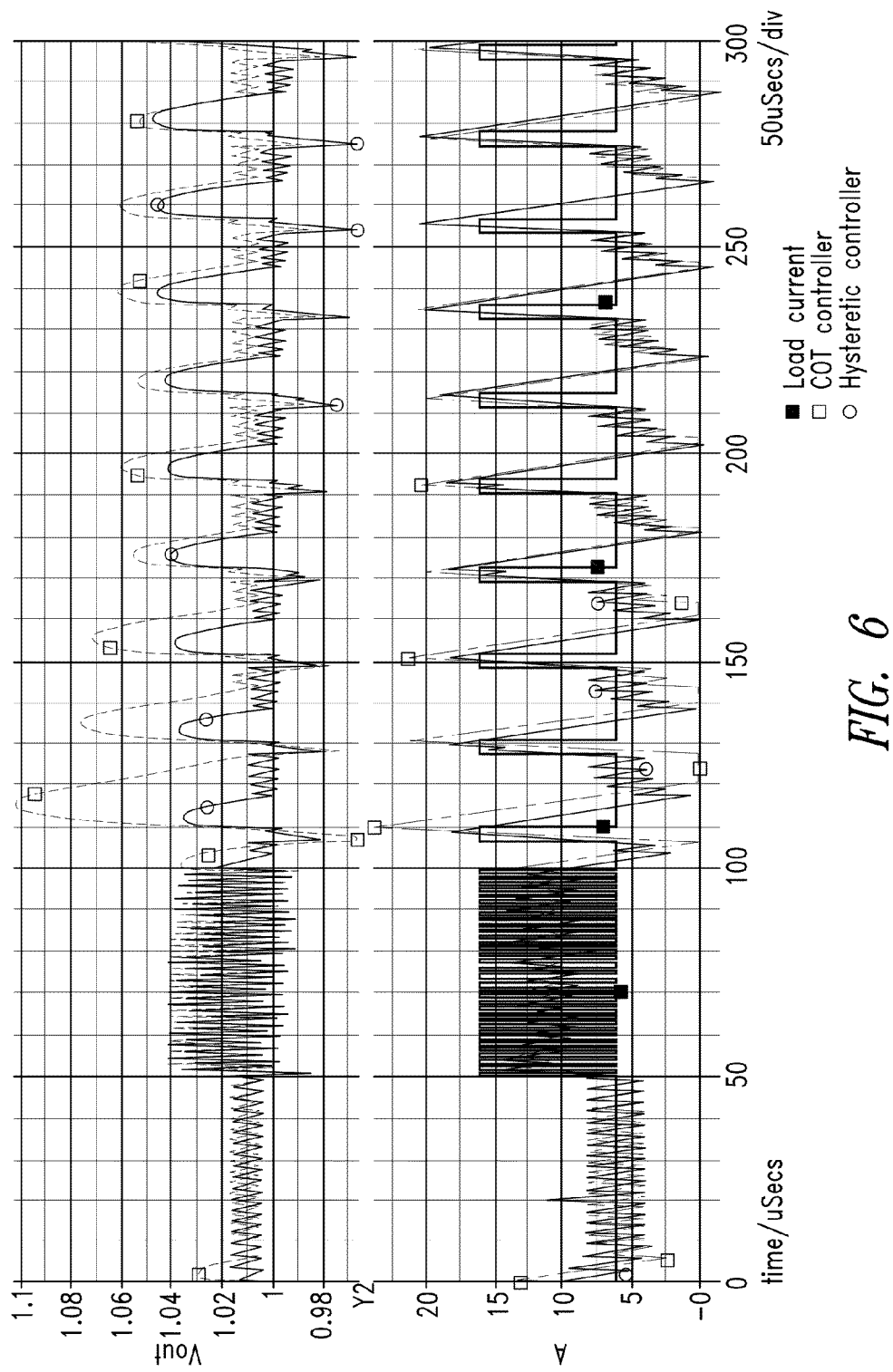
FIG. 6 compares exemplary graphs of simulation of the functioning of the voltage regulators of FIGS. 4 and 5 when the instantaneous frequency of the delivered current varies relevantly during each switching cycle.

Differently from the known architecture of FIG. 4, the control circuit 100 includes a logic circuit 106 configured to block a reset signal R for a selected minimum time interval after an active edge of the set signal, and to force a reset of the S/R flip-flop when a maximum time interval MaxTON has elapsed from an active edge of the set signal S. In practice, the logic circuit 106 makes the supplied load be powered always for at least a minimum time interval MinTON and no longer than a maximum time interval MaxTON when the S/R flip-flop is set. This is done in the embodiment of FIG. 8 using a first monostable multivibrator 108 configured to generate a first null flag for the minimum time interval MinTON starting from active edges of the set signal and a second monostable multivibrator 110 configured to generate a second null flag for the maximum time interval MaxTON starting from active edges of the set logic signal. For the purposes of this description, the first and second null flags can be considered to correspond to a logic 0 value.

In the logic circuit 106, the reset output of the hysteresis comparator 102 and the output of the first monostable multivibrator 108 are coupled to respective inputs of an AND gate 112. The output of the AND gate 112 and the output of the second monostable multivibrator 110 are coupled to respective inputs of an OR gate 114, which in turn has an output coupled to the reset terminal of the S/R flip-flop 104. In this configuration, a reset signal from the hysteresis comparator 102 cannot pass the AND gate 112 while the first flag is null, and thus once set, the S/R flip-flop 104 remains set for at least the minimum time interval MinTON, at which time the first monostable multivibrator 108 resets to a logic 1 state, and the AND gate 112 is enabled to transmit a reset signal from the hysteresis comparator 102. Meanwhile, at the end of the maximum time interval MaxTON, the second monostable multivibrator 110 resets to a logic 1 state, which is transmitted via the OR gate 114 to the S/R flip-flop 104. Thus, if the hysteresis comparator 102 has not produced a reset signal by the end of the maximum time interval, the S/R flip-flop 104 is reset by the second monostable multivibrator 110.

This control prevents an immediate turn off of the power stage due to a transient fast reduction of the load, and ensures that the power stage is turned off even if the hysteresis comparator does not generate a reset signal because of a transient fast increase of the load. According to an embodiment, the on-time of the switching regulator is a percentage of a steady-state on-time, this percentage being adjusted in a pre-established range in order to follow variations of the load and to neglect transient fast fluctuations thereof.

According to an embodiment, the on-time may be adjusted between 50% and 150% of the steady-state on-time, though different percentages may be used depending on the considered application. Preferably, the percentage range will be symmetrical in respect to the steady-state on-time, though an asymmetrical percentage range (for example 60% to 160%) is possible.

As usual in this field, the steady-state on-time TON may be determined using an oscillator that generates a reference switching logic signal at a reference frequency Freference having an active pulse duration equal to TON, by charging a capacitor with a fixed current when the reference signal is active and by discharging the capacitor with the fixed current when the PWM driving signal of the power stage is high. With this technique, the average voltage on this capacitor is proportional to the steady-state on-time TON.

The switching frequency of the PWM driving signal is adjusted by comparing the present TON duration with the steady-state on-time TON: if the present TON duration is greater than the steady-state on-time, the hysteresis window is reduced, otherwise it is increased.

While an exemplary embodiment has been described, it will be recognized that the associated principles can be implemented using other circuits and logic structures. For example, the logic circuit 106 of FIG. 8 includes an AND gate 112 and an OR gate 114. It is well known that identical logic functions can be performed by wide varieties of logic gate types and configurations. Thus, any gate arrangement that functions as the gates described above is considered to be equivalent.

Furthermore, the disclosed operation of the logic circuit 106 can be performed using many different arrangements of timers and switches, any of which is considered to be equivalent. Additionally, the disclosed principles can be applied also to switching regulators structured differently from those shown and described above and in the incorporated reference.

The various embodiments embodiment described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A control circuit, comprising:
   a hysteresis comparator configured to receive an error voltage and to generate first and second logic signals that become logically active respectively when the error voltage is below a lower threshold and above a higher threshold;
   a set/reset flip-flop configured to generate a regulator control signal according to the logic values assumed by said first and second logic signals;
   a first monostable multivibrator configured to output a first logic value for a minimum time interval starting from an active edge of said first logic signal, and to otherwise output a second logic value;
   a second monostable multivibrator configured to output a third logic value for a maximum time interval starting from the active edge of said first logic signal and to otherwise output a fourth logic value; and
   logic gates configured to reset said set/reset flip-flop when said second logic signal is active and said first monostable multivibrator outputs the second logic value to prevent reset of said set/reset flip-flop by said second logic signal before the minimum time interval has elapsed from the active edge of said first logic signal, the logic gates are configured to reset said set/reset flip-flop when said second monostable multivibrator outputs the fourth logic value to ensure reset of said set/reset flip-flop by the end of the maximum time interval from the active edge of the first logic signal.

2. The control circuit of claim 1, wherein said minimum time interval is 50% of a steady-state on-time of a switching cycle, and said maximum time interval is 150% of said steady-state on-time.

3. The control circuit of claim 1, wherein the hysteresis comparator has a first output terminal for outputting the first logic signal and a second output terminal for outputting the second logic signal.

4. The control circuit of claim 3, wherein the first monostable multivibrator has an output terminal for outputting the first logic value or the second logic value and the second monostable multivibrator has an output terminal for outputting the third logic value or the fourth logic value.

5. The control circuit of claim 4, wherein logic gates include:
   an AND gate having a first input terminal coupled to the second output terminal of the hysteresis comparator, a second input terminal coupled to the output terminal of the first monostable multivibrator, and an output terminal; and
   an OR gate having a first input coupled to the output terminal of the AND gate, a second input coupled to the output terminal of the second monostable multivibrator and an output coupled to the reset terminal of the set/reset flip-flop.

6. A voltage regulator, comprising:
   an error amplifier with a reference voltage input and a feedback voltage input, and configured to generate at an output an error voltage corresponding to a difference between a reference voltage and a feedback voltage representative of a regulated output voltage of the voltage regulator;
   a switching power stage configured to be controlled by a control signal and to generate said regulated output voltage; and
   a control circuit, including:
      a hysteresis comparator having an input terminal coupled to the output of the error amplifier, and first and second output terminals configured to respectively output set and reset signals,
      a set/reset flip-flop configured to produce the control signal and having an output terminal coupled to the switching power stage, a set terminal coupled to the first output terminal of the hysteresis comparator, and a reset terminal,
      a first monostable multivibrator having an input terminal coupled to the first output terminal of the hysteresis comparator and output terminal, the first monostable multivibrator being configured to output, at the output terminal, a first logic value for a first time period starting from an active edge of the set signal, and to otherwise output a second logic value,
      a second monostable multivibrator having an input terminal coupled to the first output terminal of the hysteresis comparator and output terminal, the second monostable multivibrator being configured to output, at the output terminal, a third logic value for a second time period starting from the active edge of the set signal and to otherwise output a fourth logic value, and
      logic gates configured to reset said set/reset flip-flop when said second logic signal is active and said first monostable multivibrator outputs the second logic value to prevent transmission of the reset signal from the second output terminal of the hysteresis comparator to the reset terminal of the set/reset flip-flop for at least the first time period following production of the active edge of the set signal at the set terminal of the set/reset flip-flop, and the logic gates being configured to reset said set/reset flip-flop when said second monostable multivibrator outputs the fourth logic value to ensure transmission of the reset signal to the reset terminal of the set/reset flip-flop within the second time period following production of the active edge of the set signal at the set terminal of the set/reset flip-flop.

7. The voltage regulator of claim 6, wherein said minimum time interval is 50% of a steady-state on-time of a switching cycle, and said maximum time interval is 150% of said steady-state on-time.

8. The voltage regulator of claim 6, wherein the logic gates include:
   an AND gate having a first input terminal coupled to the second output terminal of the hysteresis comparator, a second input terminal coupled to the output terminal of the first monostable multivibrator, and an output terminal; and
   an OR gate having a first input coupled to the output terminal of the AND gate, a second input coupled to the output terminal of the second monostable multivibrator and an output coupled to the reset terminal of the set/reset flip-flop.

9. A method, comprising:
controlling a switching voltage regulator to generate on an output terminal a regulated output voltage, the controlling including:
inputting an error amplifier with a reference voltage and with a feedback voltage representing said regulated output voltage, the error amplifier generating an error voltage corresponding to the difference between the reference voltage and the feedback voltage;
generating first and second logic signals that become logically active respectively when the error voltage is below a lower threshold and above a higher threshold
producing a control signal at an output of a set/reset flip-flop according to the logic values assumed by said first and second logic signals first and second;
masking, by a first monostable multivibrator, said second logic signal for a minimum time from an active edge of said first logic signal;
as a result of the masking by the first monostable multivibrator, outputting by the first monostable multivibrator a first logic value for the minimum time interval starting from the active edge of said first logic signal and otherwise a second logic value;
masking, by a second monostable multivibrator, said second logic signal for a maximum time from the active edge of said first logic signal;
as a result of the masking by the second monostable multivibrator, outputting by the second monostable multivibrator a third logic value for a maximum time interval starting from the active edge of said first logic signal and otherwise a fourth logic value; and
resetting said set/reset flip-flop if said second logic signal is active and the first monostable multivibrator is outputting the second logic value to prevent reset of said set/reset flip-flop by said second logic signal before the minimum time interval has elapsed from the active edge of said first logic signal and resetting said set/reset flip-flop if second monostable multivibrator is outputting the fourth logic value to ensure reset of said set/reset flip-flop by the end of the maximum time interval from the active edge of the first logic signal.

10. The method of claim 9, comprising charging an output capacitor of the voltage regulator only while producing the active switching control signal.

11. A device, comprising:
a control circuit configured to:
receive an error signal representative of an output voltage of a voltage regulator in relation to a nominal output voltage of the voltage regulator,
begin producing an active switching control signal when the error signal drops below a first value,
continue producing the active switching control signal for at least a selected minimum time period following a drop of the error signal below the first value,
terminate the active switching control signal at the end of the selected minimum time period if the error signal rises above a second value, greater than the first value, during the selected minimum time period,
terminate the active switching control signal when the error signal rises above the second value if the error signal rises above the second value after the end of the selected minimum time period and before the end of a selected maximum time period following the drop of the error signal below the first value, and
terminate the active switching control signal at the end of the selected maximum time period if the error signal does not rise above the second value before the end of the selected maximum time period;
the control circuit includes:
a first monostable multivibrator configured to switch from a first stable state to a first transient state during the selected minimum time period following the drop of the error signal below the first value and to return to the first stable state at the end of the selected minimum time period;
a second monostable multivibrator configured to switch from a second stable state to a second transient state during the selected minimum time period following the drop of the error signal below the first value and to return to the second stable state at the end of the selected maximum time period; and
a logic circuit configured to prevent transmission of the active switching control signal during the selected minimum time period and to thereafter enable transmission of the active reset signal, the logic circuit being configured to transmit the active switching control signal at the end of the selected maximum time period.

12. The device of claim 11, comprising a switching voltage regulator having a control terminal coupled to an output of the control circuit, configured to switch in accordance with the switching control signal supplied by the control circuit.

13. The device of claim 11, wherein the control circuit comprises:
a set/reset flip-flop configured to begin producing the active switching control signal when an active set signal is produced at a set terminal and to terminate the active switching control signal when an active reset signal is produced at a reset terminal,
a hysteresis comparator configured to produce the active set signal at a first output coupled to the set terminal beginning when the error signal drops below the first value and to produce an active reset signal at a second output coupled to the reset terminal beginning when the error signal rises above the second value.

14. The device of claim 13, wherein the logic circuit comprises:
a gate circuit coupled between the second output of the hysteresis comparator and the reset terminal of the set/reset flip-flop, configured to block transmission of the active reset signal from the second output to the reset terminal while the first monostable multivibrator is in the transient state, and to present the alternate active reset signal at the reset terminal except while the second monostable multivibrator is in the second transient state.

* * * * *